(12) United States Patent
Zong et al.

(10) Patent No.: US 11,645,540 B2
(45) Date of Patent: May 9, 2023

(54) DEEP GRAPH DE-NOISE BY DIFFERENTIABLE RANKING

(71) Applicant: NEC Laboratories America, Inc., Princeton, NJ (US)

(72) Inventors: Bo Zong, West Windsor, NJ (US); Cheng Zheng, Los Angeles, CA (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 476 days.

(21) Appl. No.: 16/936,600

(22) Filed: Jul. 23, 2020

(65) Prior Publication Data

US 2021/0049414 A1     Feb. 18, 2021

Related U.S. Application Data

(60) Provisional application No. 62/910,726, filed on Oct. 4, 2019, provisional application No. 62/885,426, filed on Aug. 12, 2019.

(51) Int. Cl.
*G06V 10/774* (2022.01)
*G06K 9/62* (2022.01)
(Continued)

(52) U.S. Cl.
CPC ...... *G06V 10/7747* (2022.01); *G06F 11/0766* (2013.01); *G06K 9/6223* (2013.01);
(Continued)

(58) Field of Classification Search
CPC .............. G06V 10/763; G06V 10/764; G06V 10/7747; G06V 30/1988; G06K 9/6223;
(Continued)

(56) References Cited

U.S. PATENT DOCUMENTS 8,359,282 B2    1/2013   Bai et al.
8,438,189 B2    5/2013   Andersen et al.
(Continued)

OTHER PUBLICATIONS

Calandriello et al., "Improved Large-Scale Graph Learning Through Ridge Spectral Sparsification", Proceedings of the 35th International Conference on Machine Learning, PMLR 80. Jul. 10-15, 2018. pp. 688-697.

(Continued)

*Primary Examiner* — Daniel G Mariam
(74) *Attorney, Agent, or Firm* — Joseph Kolodka

(57) ABSTRACT

A method for employing a differentiable ranking based graph sparsification (DRGS) network to use supervision signals from downstream tasks to guide graph sparsification is presented. The method includes, in a training phase, generating node representations by neighborhood aggregation operators, generating sparsified subgraphs by top-k neighbor sampling from a learned neighborhood ranking distribution, feeding the sparsified subgraphs to a task, generating a prediction, and collecting a prediction error to update parameters in the generating and feeding steps to minimize an error, and, in a testing phase, generating node representations by neighborhood aggregation operators related to testing data, generating sparsified subgraphs by top-k neighbor sampling from a learned neighborhood ranking distribution related to the testing data, feeding the sparsified subgraphs related to the testing data to a task, and outputting prediction results to a visualization device.

20 Claims, 13 Drawing Sheets

Procedure of DRGS

(51) Int. Cl.
  *G06F 11/07* (2006.01)
  *G06N 3/04* (2023.01)
  *G06V 30/196* (2022.01)
(52) U.S. Cl.
  CPC ......... *G06K 9/6257* (2013.01); *G06K 9/6276* (2013.01); *G06N 3/0454* (2013.01); *G06V 30/1988* (2022.01)
(58) Field of Classification Search
  CPC . G06K 9/6276; G06F 11/0766; G06N 3/0454
  See application file for complete search history.

(56) References Cited

U.S. PATENT DOCUMENTS

| | | | |
|---|---|---|---|
| 8,818,918 B2* | 8/2014 | Lin | G06N 5/003 707/690 |
| 10,096,088 B2 | 10/2018 | Bitterli et al. | |
| 10,565,685 B2 | 2/2020 | Adler et al. | |
| 2009/0271433 A1 | 10/2009 | Perronnin et al. | |
| 2016/0098820 A1 | 4/2016 | Rousselle et al. | |
| 2017/0046614 A1* | 2/2017 | Golovashkin | G06N 3/082 |
| 2019/0266528 A1* | 8/2019 | Cheng | G06N 20/00 |
| 2020/0151563 A1 | 5/2020 | Zong et al. | |

OTHER PUBLICATIONS

Mathioudakis et al., "Sparsification of Influence Networks", Proceedings of the 17th ACM SIGKDD International Conference on Knowledge Discovery and data mining. Aug. 21-24, 2011. pp. 529-537.

Spielman et al., "Graph Sparsification by Effective Resistances", SIAM Journal on Computing. arXiv:0803.0929v4. Nov. 18, 2009. pp. 1-16.

Voudigari et al. "Rank Degree: An Efficient Algorithim for Graph Sampling", 2016 International Conference on Advances in Social Networks Analysis and Mining. Aug. 18, 2016. pp. 120-129.

* cited by examiner

First-Order Neighborhood Aggregation

$$z^{(1)}_u = M_w(x_u, \{x_v \mid v \text{ in } N_u\}, \{e_{u,v} \mid v \text{ in } N_u\})$$

Edge Importance Score

$$z_{u,v} = \text{MLP}_\theta(z_u, z_v, e_{u,v})$$

Soft Permutation Matrix

$$P_{sort}[i,:] = \frac{\exp(((n+1-2i)g_{u,i} - A_g[i,:]U)/\tau)}{\sum_{j \in N_u} \exp(((n+1-2i)g_{u,j} - A_g[j,:]U)/\tau)}$$

FIG. 13

DEEP GRAPH DE-NOISE BY DIFFERENTIABLE RANKING

RELATED APPLICATION INFORMATION

This application claims priority to Provisional Application No. 62/885,426, filed on Aug. 12, 2019, and Provisional Application No. 62/910,726, filed on Oct. 4, 2019, the contents of which are incorporated herein by reference in their entirety.

BACKGROUND

Technical Field

The present invention relates to graph sparsification and, more particularly, to methods and systems for deep graph de-noise by differentiable ranking.

Description of the Related Art

A graph is a data structure for representing relational information in real-life applications. In practice, graph data are usually large with millions of nodes and billions of edges. The large size of graphs challenges graph learning methods with regard to overfitting risk, visualization difficulty, and scalability. As large graphs are usually noisy, a subset of nodes and edges from original graphs could be sufficient enough for real-life applications. Graph sparsification is a data reduction operation that extracts a subset of nodes and edges from the original large size graph. The resulting sparse subgraph helps users visualize, explore, digest, and interpret data. Moreover, graph sparsification also helps in reducing noise in the data and in avoiding model overfitting in machine learning based applications.

SUMMARY

A computer-implemented method for employing a differentiable ranking based graph sparsification (DRGS) network to use supervision signals from downstream tasks to guide graph sparsification is presented. The method includes, in a training phase, generating node representations by neighborhood aggregation operators, generating sparsified subgraphs by top-k neighbor sampling from a learned neighborhood ranking distribution, feeding the sparsified subgraphs to a task, generating a prediction, and collecting a prediction error to update parameters in the generating and feeding steps to minimize an error. The method further includes, in a testing phase, generating node representations by neighborhood aggregation operators related to testing data, generating sparsified subgraphs by top-k neighbor sampling from a learned neighborhood ranking distribution related to the testing data, feeding the sparsified subgraphs related to the testing data to a task, and outputting prediction results to a visualization device.

A non-transitory computer-readable storage medium comprising a computer-readable program is presented for employing a differentiable ranking based graph sparsification (DRGS) network to use supervision signals from downstream tasks to guide graph sparsification, wherein the computer-readable program when executed on a computer causes the computer to perform the steps of, in a training phase, generating node representations by neighborhood aggregation operators, generating sparsified subgraphs by top-k neighbor sampling from a learned neighborhood ranking distribution, feeding the sparsified subgraphs to a task, generating a prediction, and collecting a prediction error to update parameters in the generating and feeding steps to minimize an error. The computer-readable program when executed on a computer causes the computer to perform the further steps of, in a testing phase, generating node representations by neighborhood aggregation operators related to testing data, generating sparsified subgraphs by top-k neighbor sampling from a learned neighborhood ranking distribution related to the testing data, feeding the sparsified subgraphs related to the testing data to a task, and outputting prediction results to a visualization device.

A system for employing a differentiable ranking based graph sparsification (DRGS) network to use supervision signals from downstream tasks to guide graph sparsification is presented. The system includes a memory and one or more processors in communication with the memory configured to, in a training phase, generate node representations by neighborhood aggregation operators, generate sparsified subgraphs by top-k neighbor sampling from a learned neighborhood ranking distribution, feed the sparsified subgraphs to a task, generate a prediction, and collect a prediction error to update parameters in the generating and feeding steps to minimize an error. The system further includes a memory and one or more processors in communication with the memory configured to, in a testing phase, generate node representations by neighborhood aggregation operators related to testing data, generate sparsified subgraphs by top-k neighbor sampling from a learned neighborhood ranking distribution related to the testing data, feed the sparsified subgraphs related to the testing data to a task, and output prediction results to a visualization device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 13 is a block/flow diagram of equations employed in an exemplary method for Differentiable Ranking based Graph Sparsification (DRGS), in accordance with embodiments of the present invention.

DETAILED DESCRIPTION OF PREFERRED EMBODIMENTS

Graph representation learning serves as the core of many prediction tasks, ranging from product recommendation in online marketing to fraud detection in the financial domain. Real-life graphs are usually large with a complex local neighborhood, where each node is described by a rich set of features and easily connects to dozens or even hundreds of neighbors. Most existing graph learning techniques rely on neighborhood aggregation, however, the complexity of real-life graphs is usually high, thus posing non-trivial overfitting risks during model training.

The exemplary embodiments of the present invention identify Differentiable Ranking based Graph Sparsification (DRGS), which is a machine learning based method that utilizes supervision signals from downstream tasks to guide graph sparsification. DRGS makes sparsification decisions based on learned latent node representations. DRGS samples top-k important neighbors from a learned neighborhood ranking distribution. By Gumbel-perturbation based re-parametric methodology, the exemplary embodiments make sparsified graphs differentiable. When subsequent prediction or classification tasks take the sparsified subgraphs as input, the exemplary methods can learn node representations and a neighborhood ranking distribution from prediction or classification error by standard gradient descent algorithms.

DRGS is a general framework that learns optimal graph sparsification for downstream prediction/classification tasks. Suppose original graphs need to be sparsified for a prediction/classification task A. DRGS includes two phases, that is, training and testing.

In the training phase, the following steps are repeated until parameters converge. Generate node representations by neighborhood aggregation operators. Generate sparsified subgraphs by top-k neighbor sampling from a learned neighborhood ranking distribution. Feed sparsified subgraphs to task A and generate a prediction. Collect the prediction error and update the parameters in the previous steps to minimize the error.

In the testing phase, DRGS follows the same processes specified in the first three steps in the training phase to generate prediction results for task A.

DRGS is different than Supervised Graph Sparsification (SGS) in the following aspects. DRGS takes learned node representations as input for sparsification decisions, while SGS takes input node features for decision making. Compared with input node features, learned node representations include additional structural information from a local neighborhood, which has the potential to further improve decision making quality. DRGS performs sparsification by top-k neighbor sampling from a learned neighborhood ranking distribution, while SGS sparsified input graphs are generated by sequential edge sampling. Compared to sequential edge sampling, top-k neighbor sampling in DRGS is concurrent with higher computation efficiency.

Figure 1:
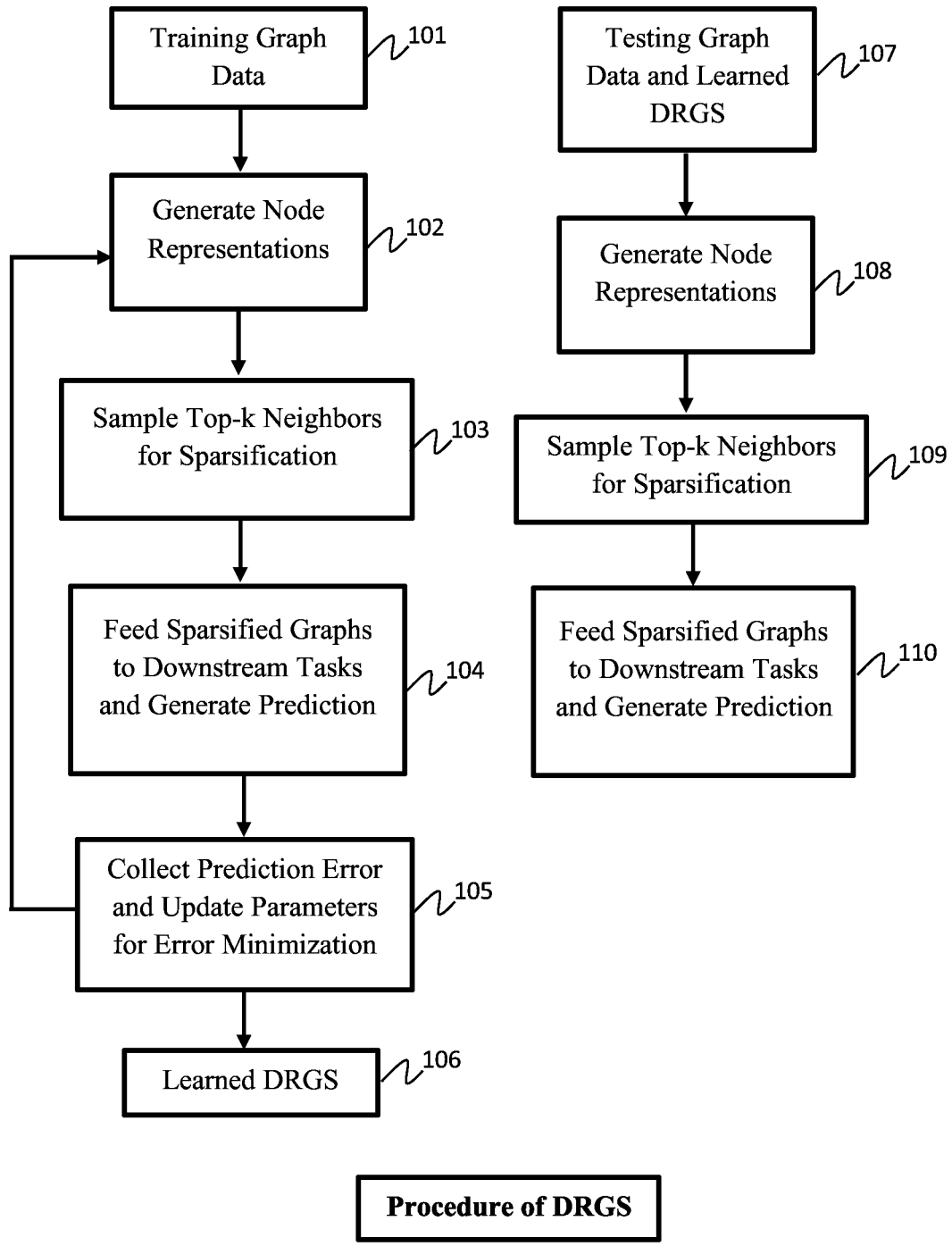
FIG. 1 is a block/flow diagram of an exemplary procedure for Differentiable Ranking based Graph Sparsification (DRGS), in accordance with embodiments of the present invention.

FIG. 1 is a block/flow diagram of an exemplary procedure for Differentiable Ranking based Graph Sparsification (DRGS), in accordance with embodiments of the present invention.

At block 101, regarding training graph data, the graph data used for training the DRGS are referred to as training graph data. Training graph data include graph data and prediction ground truth.

Graph data include a set of nodes and a set of edges between the nodes. In the case of syscall graphs discussed in FIG. 10, nodes are system entities, such as processes, files, sockets, and so on, and edges indicate system dependency between such entities.

Figure 2:
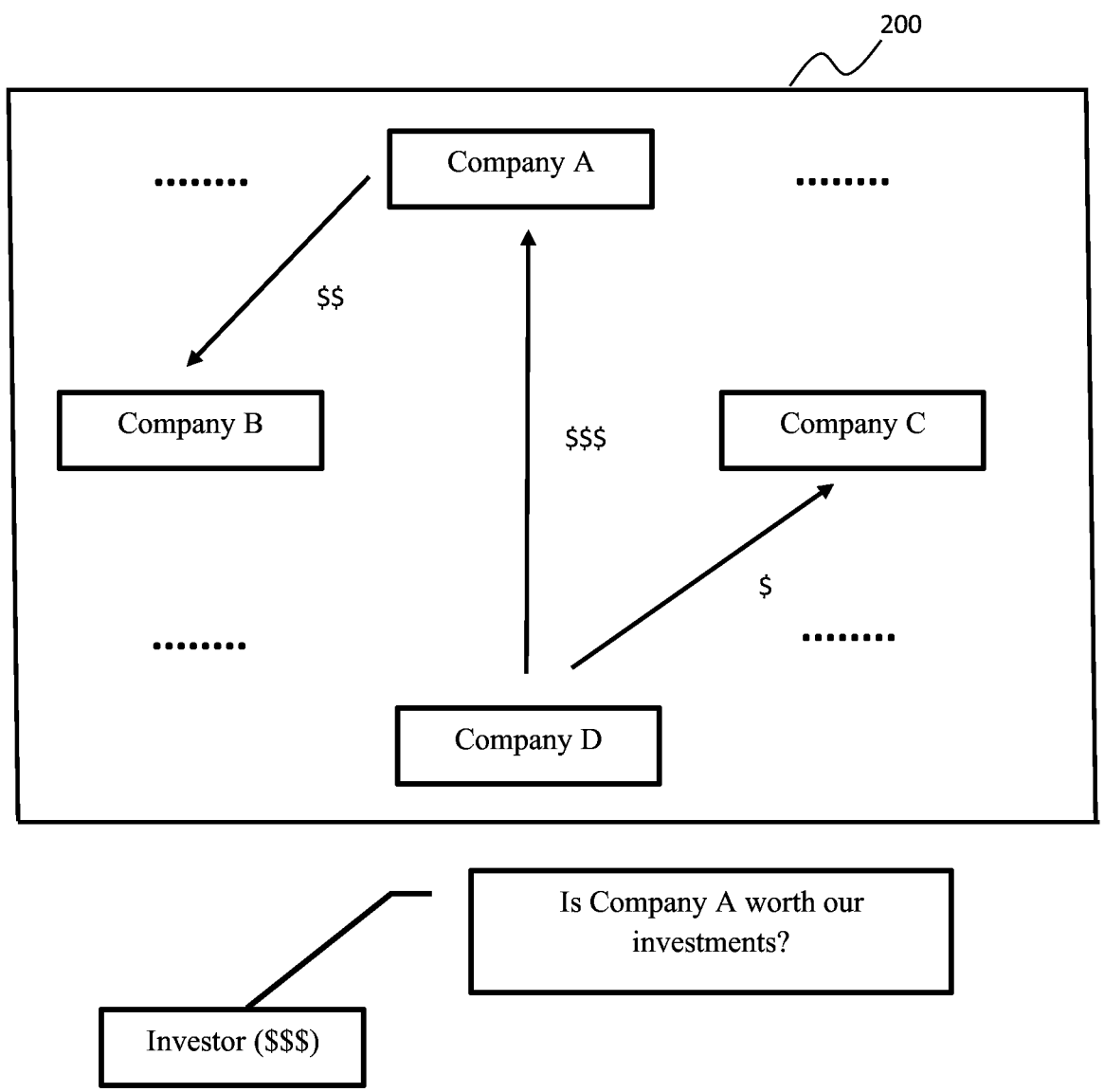
FIG. 2 is a block/flow diagram of an exemplary classification task on a financial graph, in accordance with embodiments of the present invention.

Regarding FIG. 2, an example of graph data in a financial domain is presented, where nodes represent companies and edges indicate transactions between companies.

Prediction ground truth is used to collect prediction error and optimize parameters in DRGS.

Figure 10:
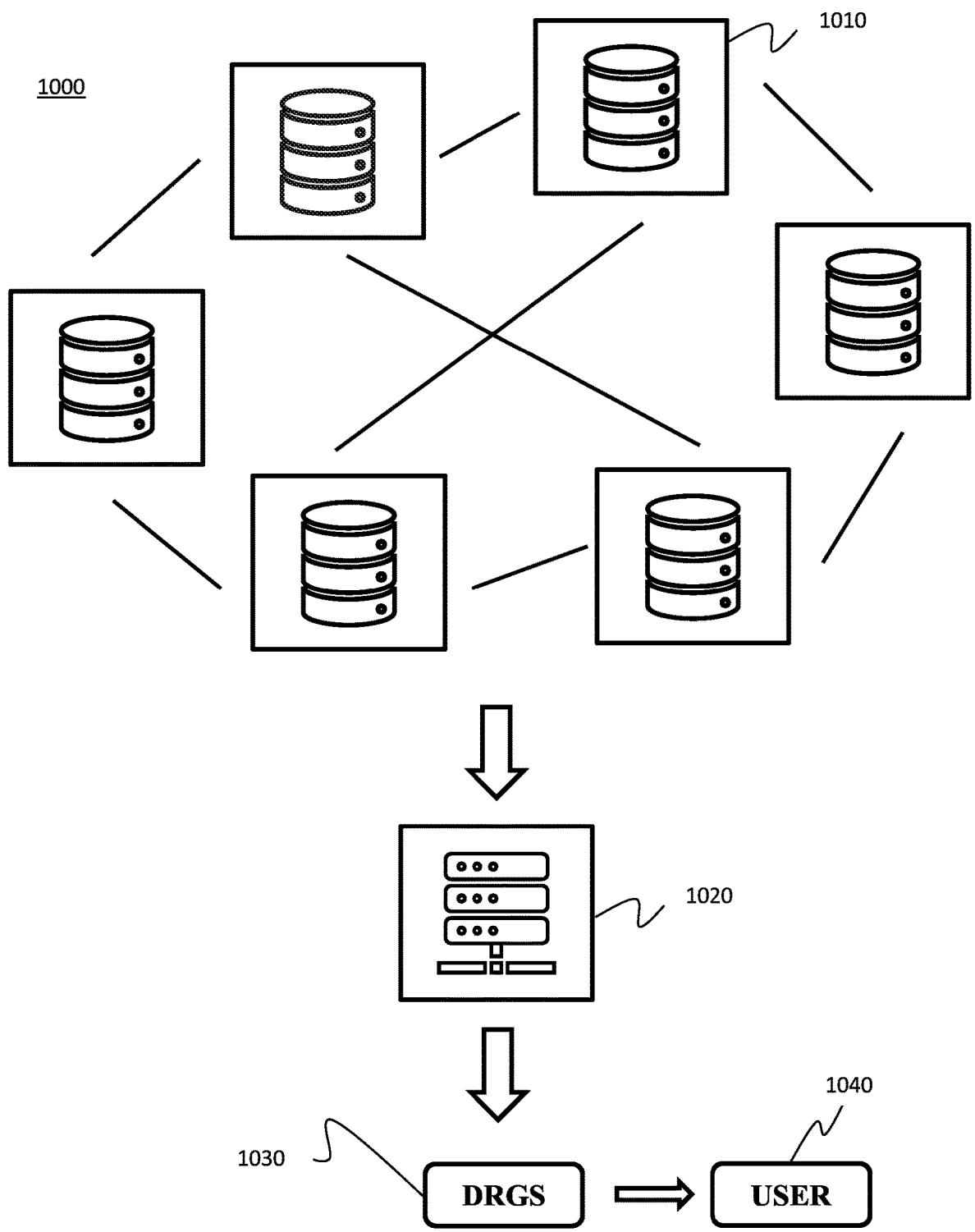
FIG. 10 is a block/flow diagram of an exemplary graph analysis in cybersecurity, in accordance with embodiments of the present invention.

For instance, when facing a malware classification problem in cybersecurity as in FIG. 10, given a syscall graph, the method predicts which processes are likely to be malware. In this case, ground truth malware identification information is provided by security experts.

For instance, when facing a classification problem in FIG. 2, given the graph about the transactions between companies, it is desired to predict which companies are promising for future investment. In this case, ground truth could be company A and B are promising, but company C and D are unpromising.

At block 102, regarding generating node features in training, DRGS takes node and edge features as input, and aggregates neighborhood information into latent node vector representations. Such representations not only encode input node/edge feature information but also structural information in each node's neighborhood. The function of this step is governed by parameters w.

At block 103, regarding sampling top-k neighbors for sparsification in training, for each node, DRGS samples a ranking over its neighborhood from a learned distribution. Top-k nodes in the ranking sample along with their edges are selected into sparsified graphs. The sampling process is governed by a learned distribution with parameters θ.

At block 104, regarding feeding sparsified graphs to downstream tasks and generating prediction in training, sparsified graphs are fed to target prediction tasks, such as the classification problem shown in FIG. 2, and produce prediction output. The prediction process for a target task is governed by parameters ψ.

At block 105, regarding collecting prediction error and update parameters, the exemplary method collects prediction error by comparing prediction output against the ground truth provided in block 101, and update parameters, including w, θ, and ψ, for error minimization.

At block 106, regarding learning DRGS, the learning process ends when parameter updates converge. A learned DRGS includes learned parameters w, θ, and ψ.

At block 107, regarding testing graph data, testing graph data share similar data format with training graph data.

Testing data are independent to training data, and ground truth for testing data is unknown.

At block 108, regarding generating node features in testing, as described in block 102, DRGS generates node representations by learned parameters w.

At block 109, regarding sampling top-k neighbors for sparsification in testing, as described in block 103, DRGS performs graph sparsification by learned parameters $\theta$.

At block 110, regarding feeding sparsified graphs to downstream tasks and generating prediction in testing, the sparsified graphs generated from block 109 are fed to target tasks and make predictions by learned parameters $\psi$.

FIG. 2 is a block/flow diagram of an exemplary classification task on a financial graph 200, in accordance with embodiments of the present invention.

In a financial domain, investors are eager to know which companies are promising for investment. In particular, investors expect a list of recommended companies, inferred based on companies' historical transaction records. As shown in FIG. 2, companies and their historical transaction records naturally form a temporal graph, shown as a graph snapshot. Each graph snapshot encodes companies' transaction data within a given time period, where nodes are companies and edges indicate transactions between companies. Note that side information of companies (e.g., industries) and transactions (e.g., transaction amount) can be represented by node attributes and edge attributes, respectively. In this task, a temporal graph of companies is provided with their transaction history and the goal is to predict companies' labels as "unpromising" or "promising" for future investment.

Figure 3:
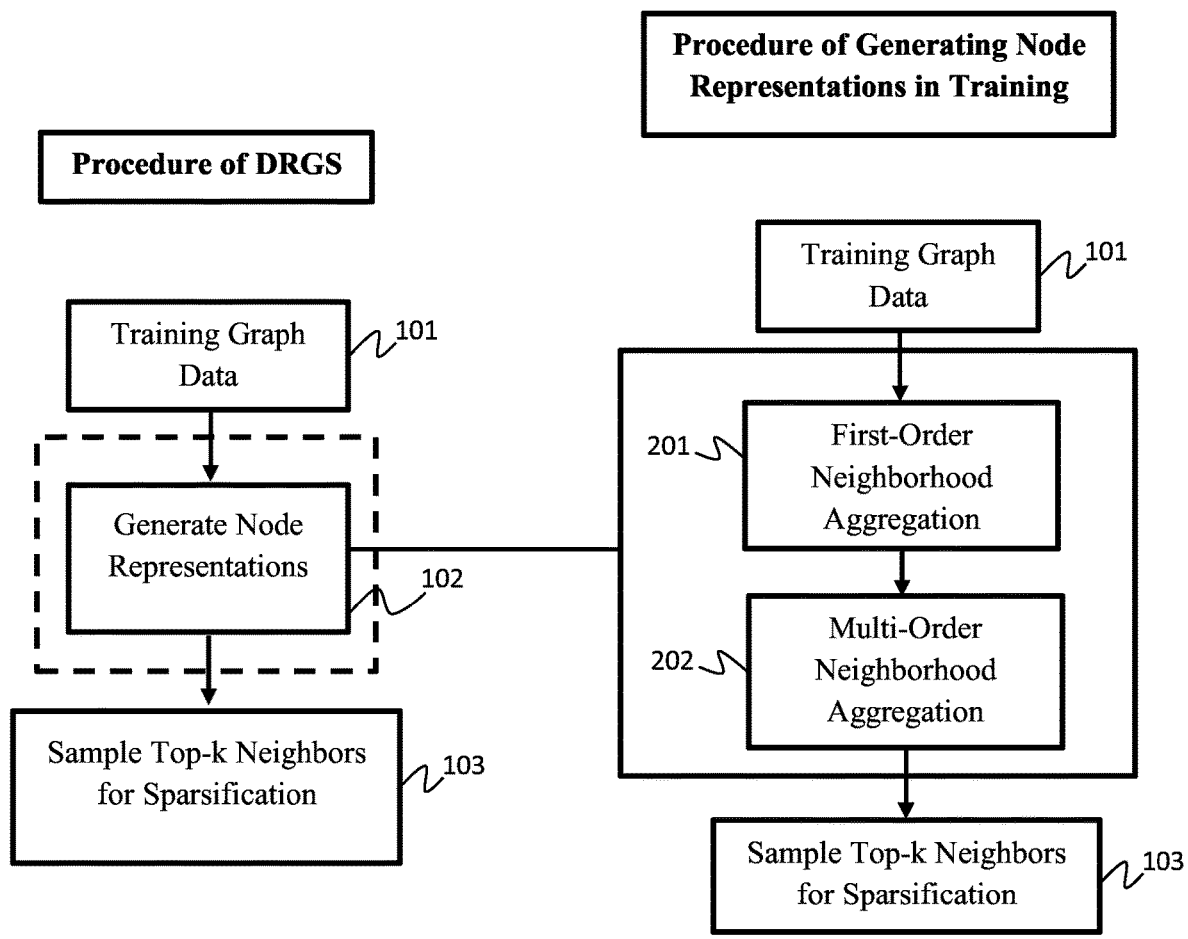
FIG. 3 is a block/flow diagram of an exemplary procedure for generating node representations in training, in accordance with embodiments of the present invention.

FIG. 3 is a block/flow diagram of an exemplary procedure for generating node representations in training, in accordance with embodiments of the present invention.

At block 201, regarding first-order neighborhood aggregation, let u be a node in an input graph, and $N_u$ be its one-hop neighborhood.

First-order neighborhood aggregation is calculated as:

$z^{(1)}_u = M_w(x_u, \{x_v | v \text{ in } N_u\}, \{e_{u,v} | v \text{ in } N_u\})$, where $z^{(1)}_u$ is the vector representation of node u after first-order neighborhood, $x_u$ is the vector representation of u's features, $x_v$ is vector representation of neighbor v's attributes, $e_{u,v}$ is the vector representation of edge features, and $M_w(\ )$ is a neighborhood aggregation function parameterized by w. While there is no limitation to the instantiation of $M_w(\ )$, existing deep learning techniques, such graph convolutional networks, graph attention networks, and so on, are possible implementations to this function.

At block 202, regarding multi-order neighborhood aggregation, similarly, the exemplary method can perform multi-order neighborhood aggregation with pre-defined operators parameterized by w.

After block 202, the exemplary method obtains node representations that encode both input features and structural information in a local neighborhood.

Figure 4:
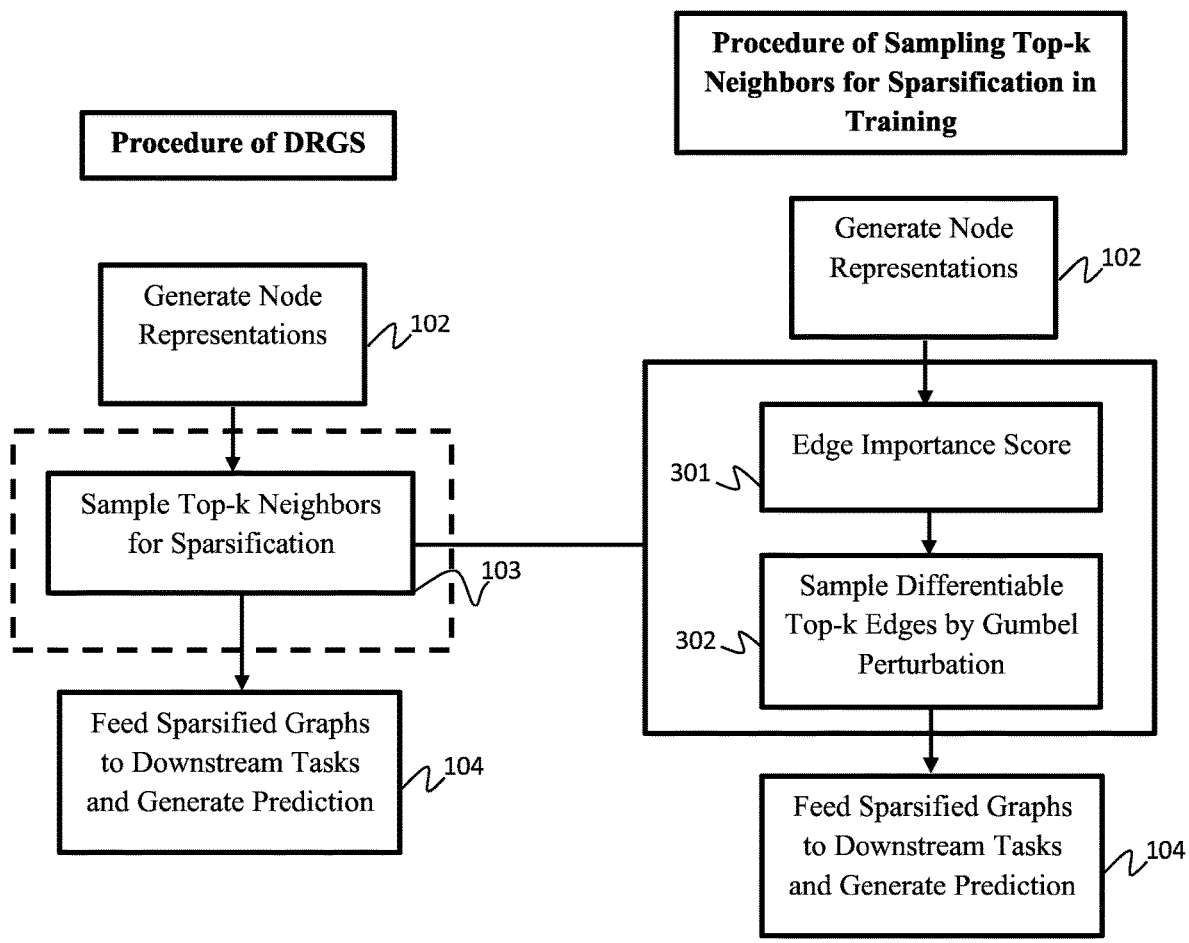
FIG. 4 is a block/flow diagram of an exemplary procedure for sampling top-k neighbors for sparsification in training, in accordance with embodiments of the present invention.

FIG. 4 is a block/flow diagram of an exemplary procedure for sampling top-k neighbors for sparsification in training, in accordance with embodiments of the present invention.

At block 301, regarding edge importance score, let u be a node and $N_u$ be its one-hop neighborhood.

For node $v \in N_u$, the importance of edge (u, v) is computed as:

$z_{u,v} = MLP_\theta(z_u, z_v, e_{u,v})$, where $z_{u,v}$ is a scalar indicating the importance score of edge (u, v), $z_u$ is the node representation of u from block 102, $z_v$ is the node representation of v from block 102, $e_{u,v}$ is the vector representation of edge features, and $MLP_{\theta(\ )}$ is a multi-layer neural network parameterized by $\theta$. Intuitively, the edge of higher importance score should be ranked higher and is more likely to be selected.

At block 302, regarding sampling differentiable top-k edges by Gumbel perturbation, without loss of generality, the exemplary method focuses on edge sampling of node u.

Edge sampling is performed as follows:

For any node $v \in N_u$, the exemplary method samples $\varepsilon_v = -\log(-\log(q))$, where q is randomly sampled from U[0, 1] (e.g., uniform distribution between 0 and 1), and $g_{u,v} = \log(z_{u,v}) + \varepsilon_v$.

To rank neighbors/edges in $N_u$, the exemplary method generates a soft permutation matrix $P_{sort}$, and its i-th row is calculated as follows:

$$P_{sort}[i, :] = \frac{\exp\left(((n + 1 - 2i)g_{u,i} - A_g[i, :]U)/\tau\right)}{\sum\limits_{j \in N_u} \exp\left(((n + 1 - 2i)g_{u,j} - A_g[j, :]U)/\tau\right)}$$

where $\tau$ is a constant, $A_g[i, j] = |g_{u,i} - g_{u,j}|$, and U is a column vector of all ones.

With $P_{sort}$, the exemplary method is able to rank edges of node u by its permutation operation and select top-k edges (e.g., first-k after permutation) for sparsification purposes. The above sampling process is concurrently performed over all nodes.

After block 302, the exemplary method obtains a sparsified subgraph from the original graph.

Figure 5:
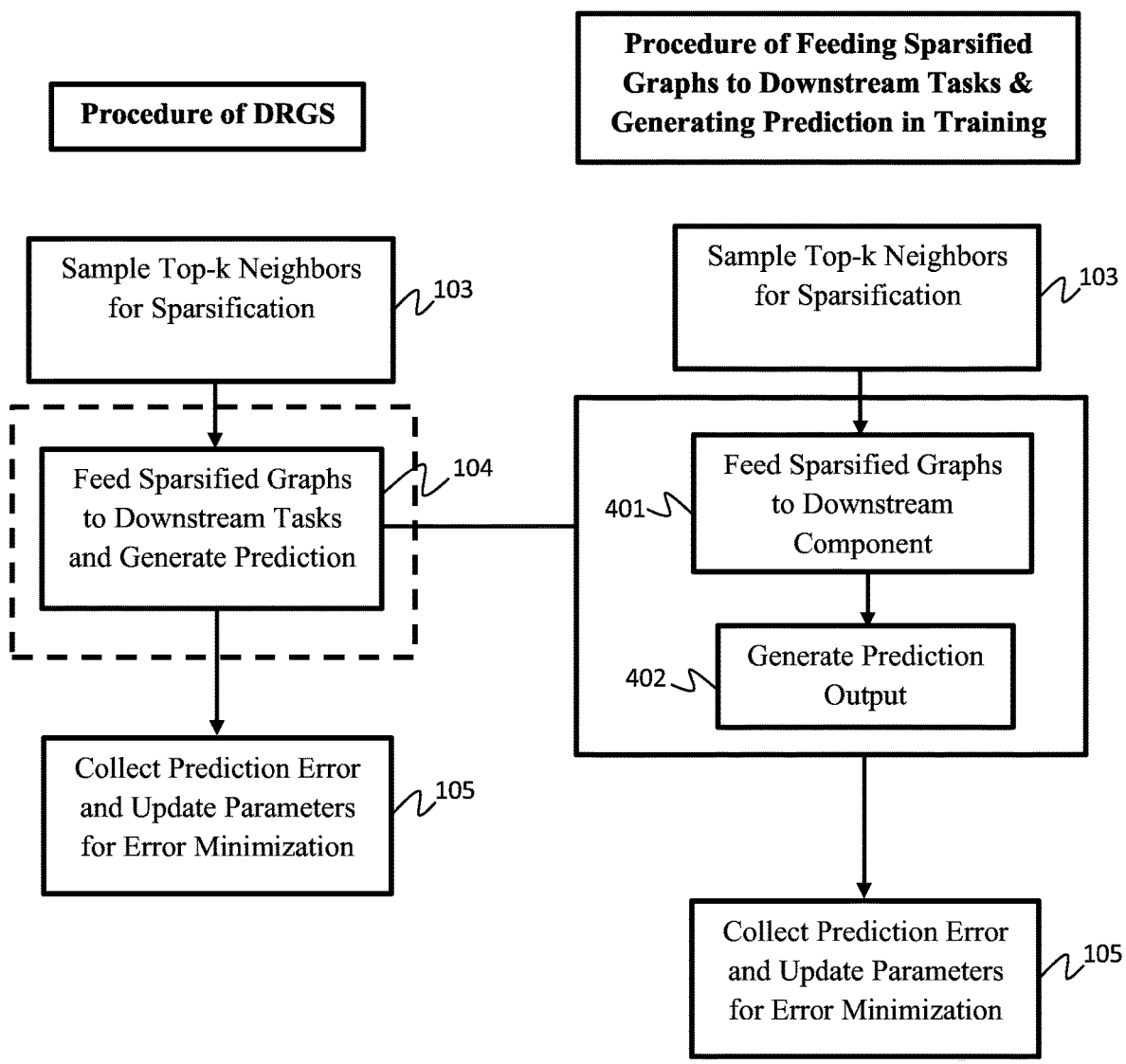
FIG. 5 is a block/flow diagram of an exemplary procedure for feeding sparsified graphs to downstream tasks and generating prediction in training, in accordance with embodiments of the present invention.

FIG. 5 is a block/flow diagram of an exemplary procedure for feeding sparsified graphs to downstream tasks and generating prediction in training, in accordance with embodiments of the present invention.

At block 401, regarding feeding sparsified graphs to a downstream component, the downstream component could be trained or non-trained. If this component is trained, the exemplary method may not make parameter updates to this component. Otherwise, the exemplary method could jointly train this component.

At block 402, regarding generating prediction output, the downstream component will perform prediction. The concrete implementation of a predictor could be a multi-layer neural network, a graph convolutional network, and so on. Parameters $\psi$ control the performance of an implemented predictor.

After block 402, the exemplary method obtains prediction output based on current parameter settings.

Figure 6:
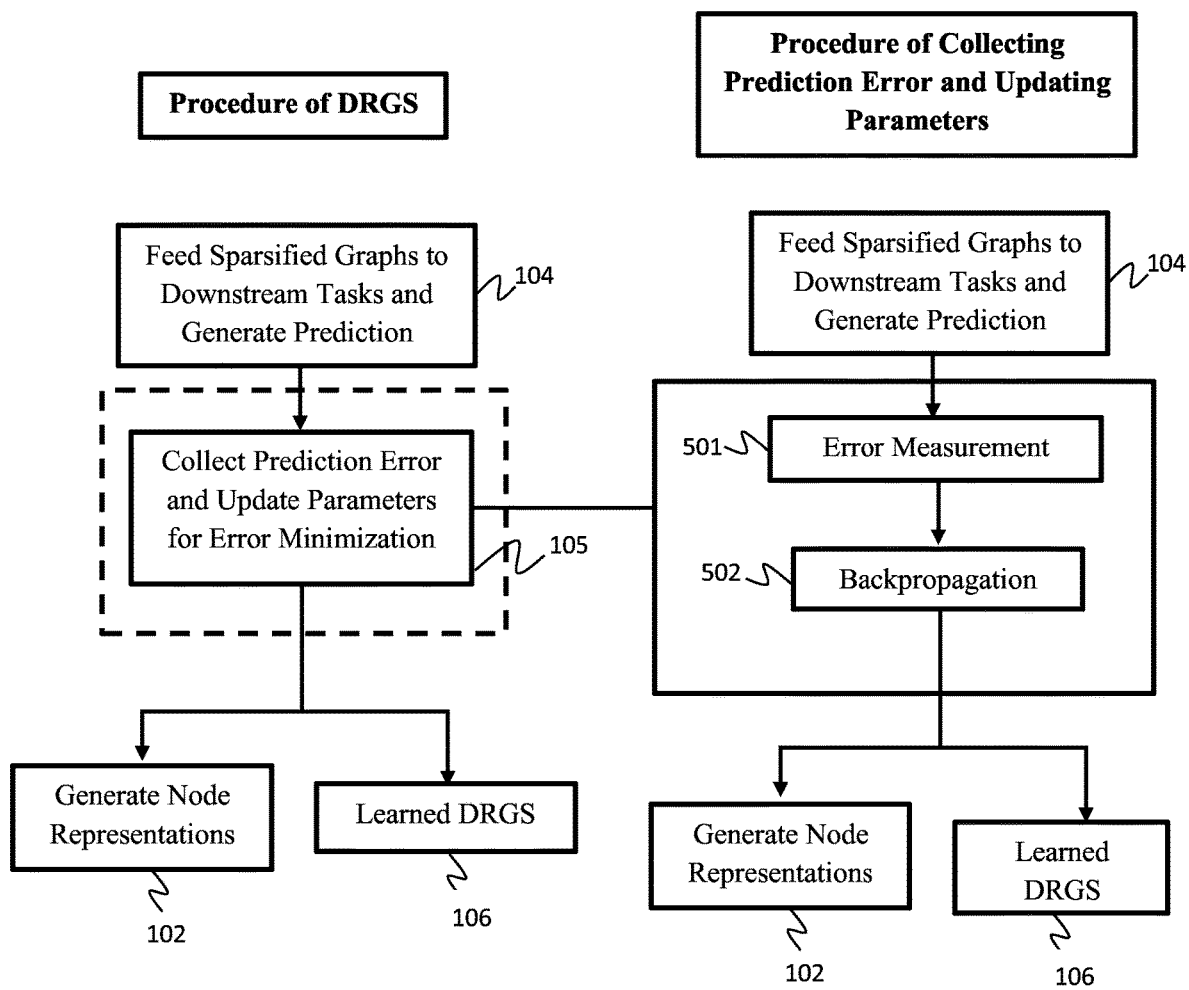
FIG. 6 is a block/flow diagram of an exemplary procedure for collecting prediction error and updating parameters, in accordance with embodiments of the present invention.

FIG. 6 is a block/flow diagram of an exemplary procedure for collecting prediction error and updating parameters, in accordance with embodiments of the present invention.

At block 501, regarding error measurement, given the ground truth in the training data and the produced prediction results from block 104, the exemplary method can utilize a standard error function, such as a mean square error for numerical value prediction or cross entropy for categorical classification, to produce the loss/error caused by current parameter settings.

At block 502, regarding backpropagation, by standard backpropagation methods, the exemplary method can update w, $\theta$, and $\psi$.

Note that blocks 102, 103, 104, and 105 are performed iteratively until parameters converge or certain stop criteria are met. After that, the workflow proceeds to block 106.

Figure 7:
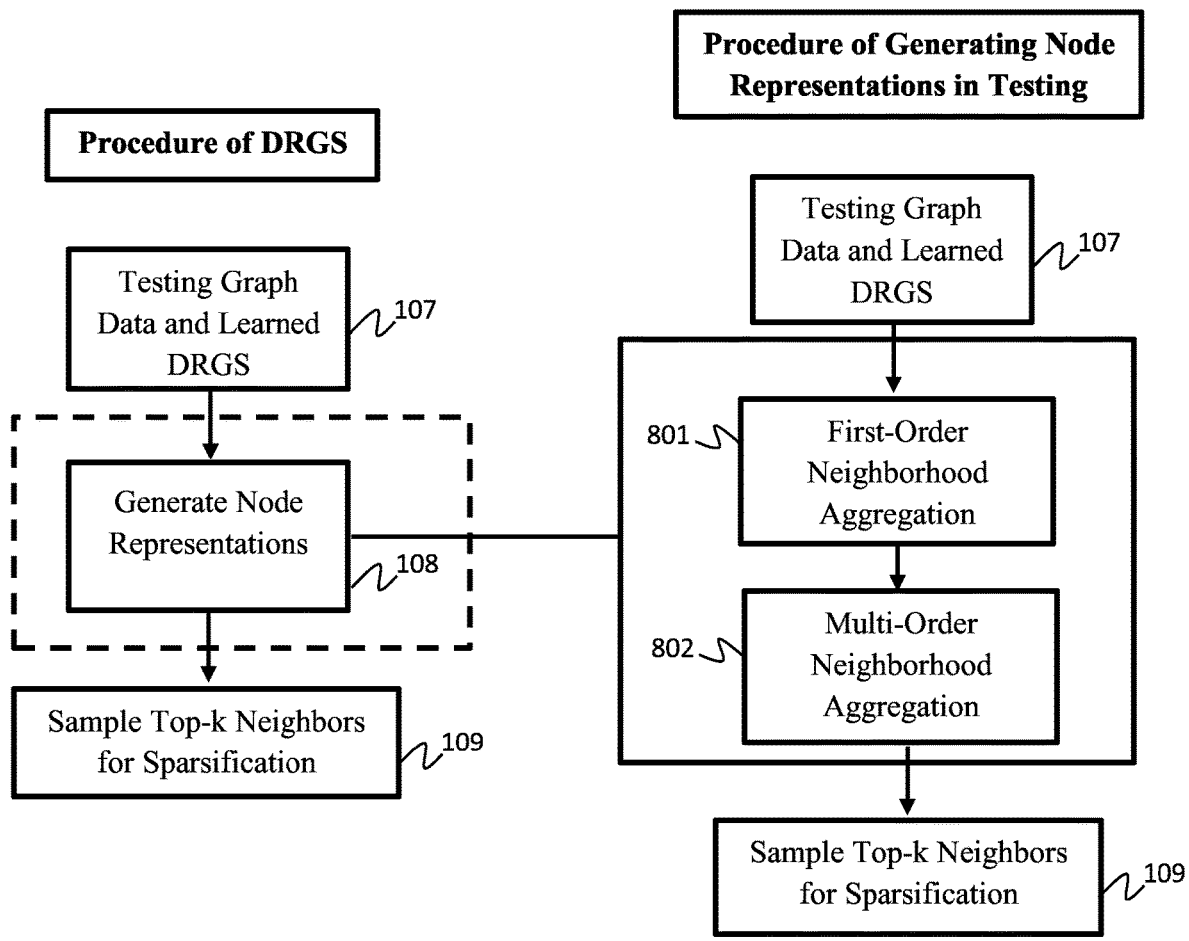
FIG. 7 is a block/flow diagram of an exemplary procedure for generating node representations in testing, in accordance with embodiments of the present invention.

FIG. 7 is a block/flow diagram of an exemplary procedure for generating node representations in testing, in accordance with embodiments of the present invention.

At block 801, regarding first-order neighborhood aggregation, similar to block 201, the exemplary method can generate node representations by first-order aggregation in testing.

At block 802, regarding multi-order neighborhood aggregation, similar to block 202, the exemplary method can generate node representations by multi-order aggregation in testing.

The output of this step is node representations for testing graphs.

Figure 8:
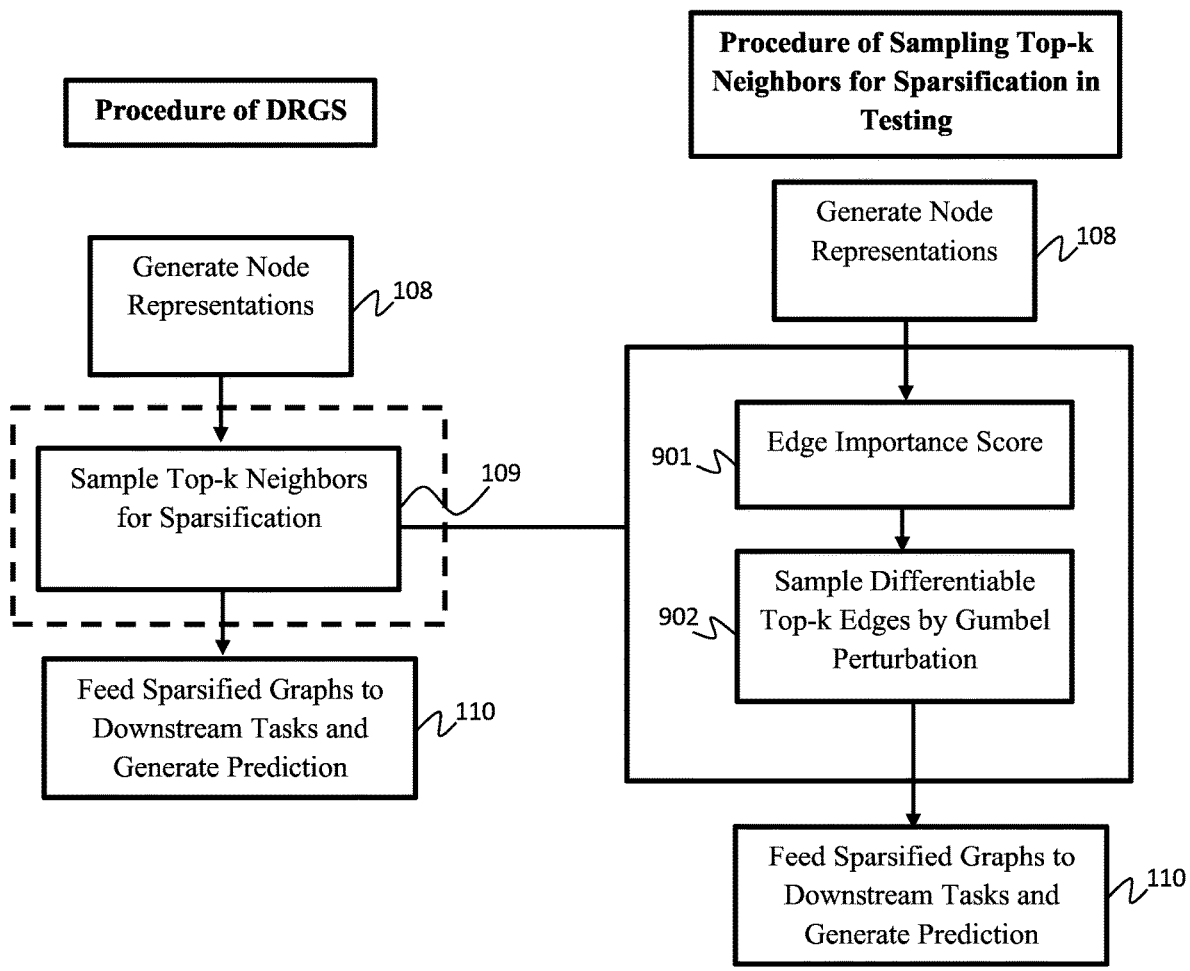
FIG. 8 is a block/flow diagram of an exemplary procedure for sampling top-k neighbors for sparsification in testing, in accordance with embodiments of the present invention.

FIG. 8 is a block/flow diagram of an exemplary procedure for sampling top-k neighbors for sparsification in testing, in accordance with embodiments of the present invention.

At block 901, regarding an edge importance score, similar to block 301, for each individual node, the exemplary method computes edge importance scores for its edges.

At block 902, regarding sampling differentiable top-k edges by Gumbel perturbation, similar to block 302, the exemplary method generates differentiable top-k edges for each individual node.

The output of block 109 is sparsified graphs in testing.

Figure 9:
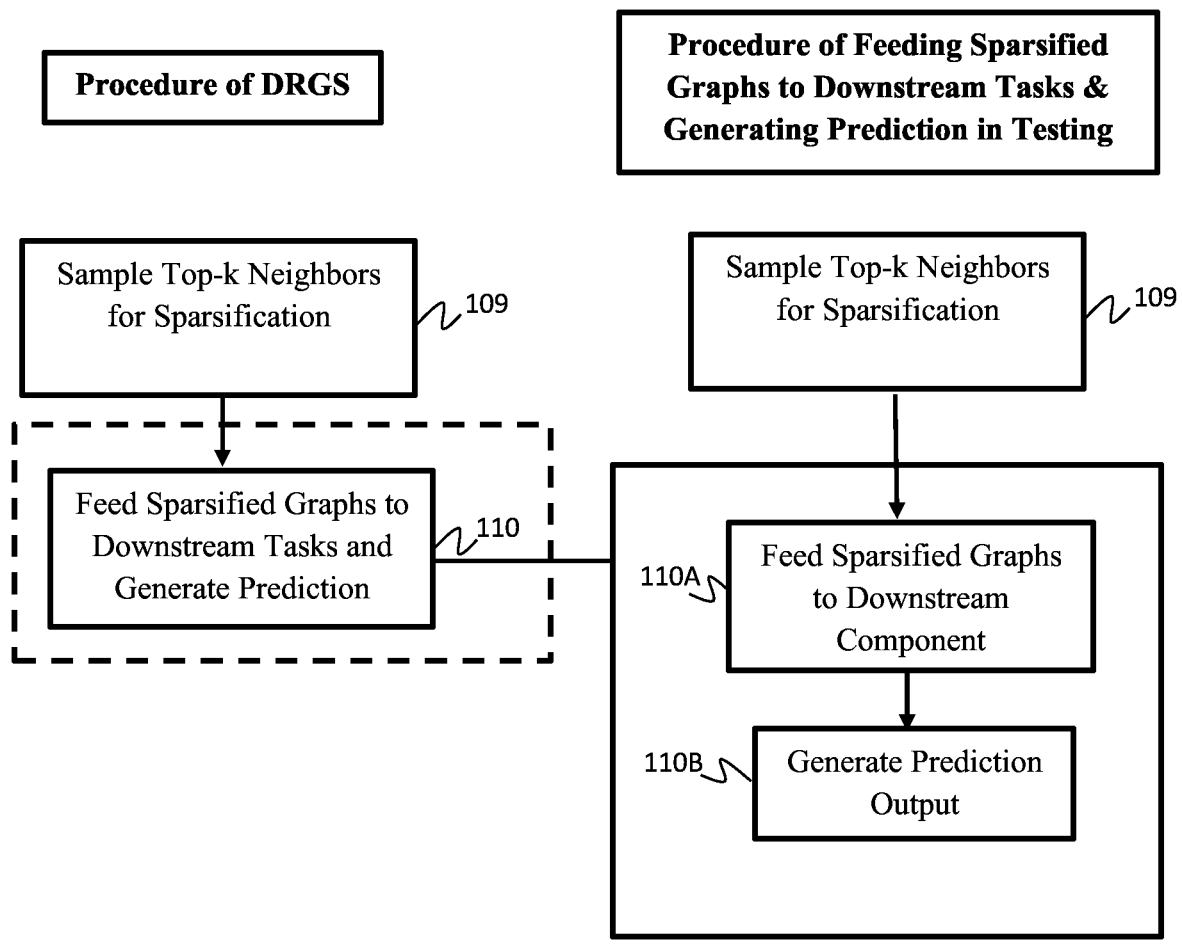
FIG. 9 is a block/flow diagram of an exemplary procedure for feeding sparsified graphs to downstream tasks and generating prediction in testing, in accordance with embodiments of the present invention.

FIG. 9 is a block/flow diagram of an exemplary procedure for feeding sparsified graphs to downstream tasks and generating prediction in testing, in accordance with embodiments of the present invention.

At block 110A, regarding feeding sparsified graphs to downstream components, similar to block 401, the exemplary method feeds sparsified graphs to downstream components in testing.

At block 110B, regarding generating prediction output, similar to block 402, the exemplary method makes predictions in testing.

FIG. 10 is a block/flow diagram of an exemplary graph analysis in cybersecurity, in accordance with embodiments of the present invention.

As shown in FIG. 10, syscall logs can be collected from a computer system 1000 by agents 1010 pre-installed in individual devices. The collected syscall logs are stored in a database 1020. Moreover, syscall logs naturally form a graph, where nodes are system entities (e.g., processes, files, sockets, etc.) and edges indicate system dependency between entities. By analyzing such a graph, the exemplary method employing DRGS 1030 can provide solutions to malware detection, system risk estimation, and so on, for end users 1040.

Figure 11:
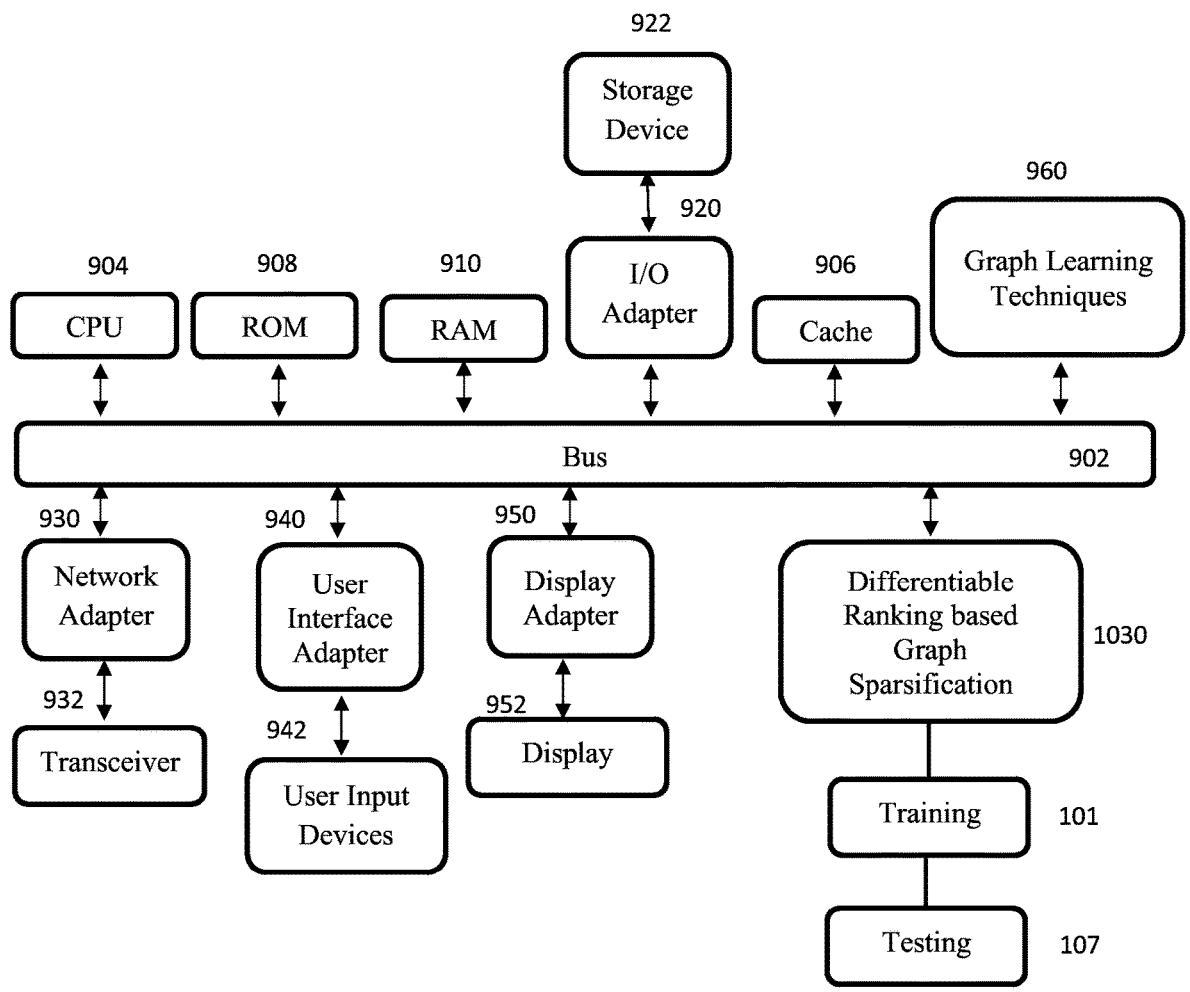
FIG. 11 is block/flow diagram of an exemplary processing system for Differentiable Ranking based Graph Sparsification (DRGS), in accordance with embodiments of the present invention.

FIG. 11 is block/flow diagram of an exemplary processing system for Differentiable Ranking based Graph Sparsification (DRGS), in accordance with embodiments of the present invention.

The processing system includes at least one processor or processor device (CPU) 904 operatively coupled to other components via a system bus 902. A cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Graph learning techniques 960 can be employed via the bus 902. The graph learning techniques 960 can employ a Differentiable Ranking based Graph Sparsification (DRGS) 1030 technique by utilizing a training phase 101 and a testing phase 107.

A storage device 922 is operatively coupled to system bus 902 by the I/O adapter 920. The storage device 922 can be any of a disk storage device (e.g., a magnetic or optical disk storage device), a solid state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 12:
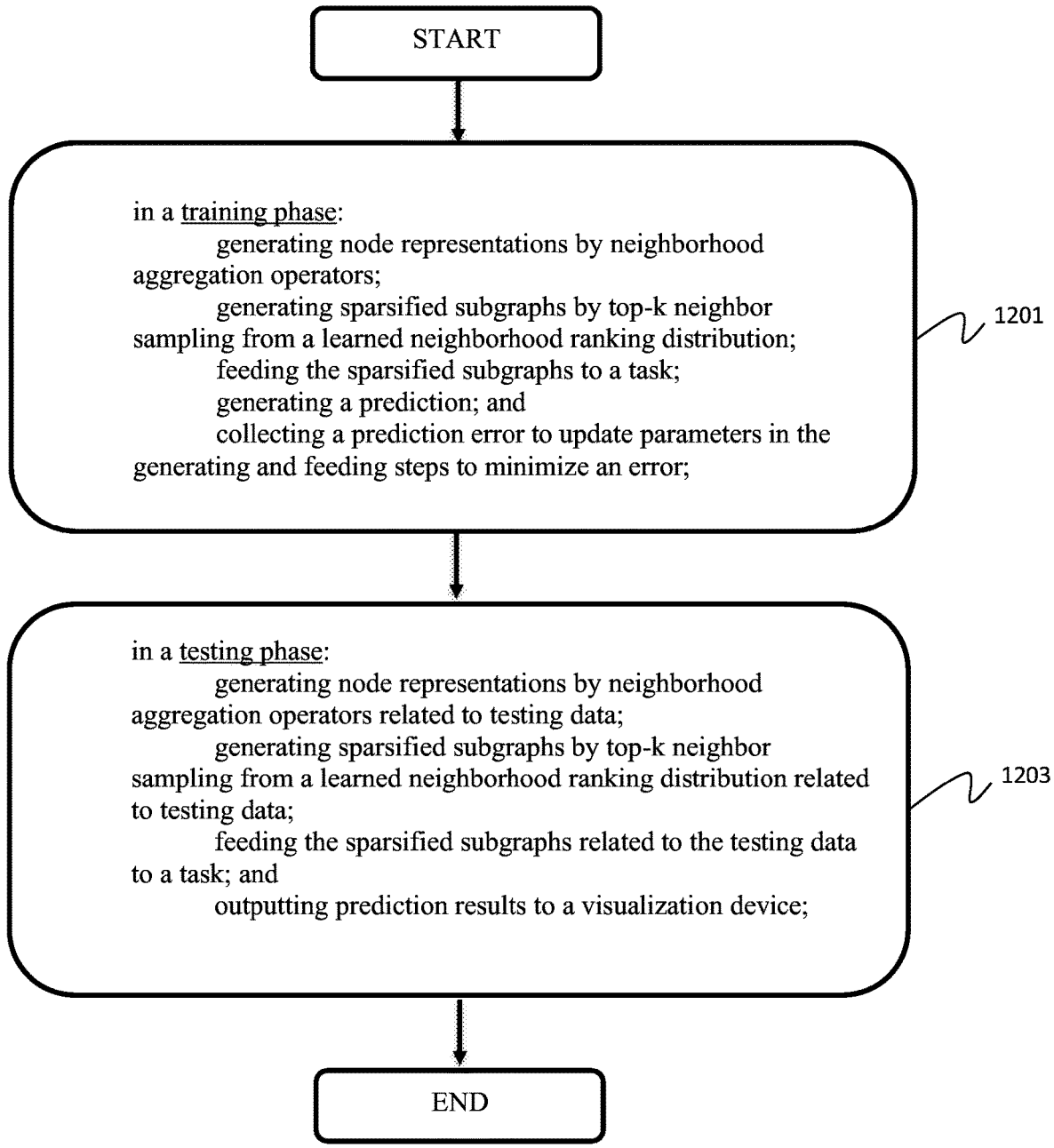
FIG. 12 is a block/flow diagram of an exemplary method for Differentiable Ranking based Graph Sparsification (DRGS), in accordance with embodiments of the present invention.

FIG. 12 is a block/flow diagram of an exemplary method for Differentiable Ranking based Graph Sparsification (DRGS), in accordance with embodiments of the present invention.

At block 1201, in a training phase, generate node representations by neighborhood aggregation operators, generate sparsified subgraphs by top-k neighbor sampling from a learned neighborhood ranking distribution, feed the sparsified subgraphs to a task, generate a prediction, and collect a prediction error to update parameters in the generating and feeding steps to minimize an error.

At block 1203, in a testing phase, generate node representations by neighborhood aggregation operators related to testing data, generate sparsified subgraphs by top-k neighbor sampling from a learned neighborhood ranking distribution related to the testing data, feed the sparsified subgraphs related to the testing data to a task, and output prediction results to a visualization device.

FIG. 13 is a block/flow diagram of equations employed in methods for Differentiable Ranking based Graph Sparsification (DRGS), in accordance with embodiments of the present invention.

Equations 1300 identify first-order neighborhood aggregation calculations, edge importance score calculations, and soft permutation matrix calculations.

In summary, the exemplary embodiments of the present invention identify Differentiable Ranking based Graph Sparsification (DRGS), which is a machine learning based method that utilizes supervision signals from downstream tasks to guide graph sparsification. DRGS makes sparsification decisions based on learned latent node representations. DRGS samples top-k important neighbors from a learned neighborhood ranking distribution. By Gumbel-perturbation based re-parametric methodology, the exemplary embodiments make sparsified graphs differentiable.

When subsequent prediction or classification tasks take the sparsified subgraphs as input, the exemplary methods can learn node representations and neighborhood ranking distribution from prediction or classification error by standard gradient descent algorithms.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for employing a differentiable ranking based graph sparsification (DRGS) network to use supervision signals from downstream tasks to guide graph sparsification, the method comprising:
   in a training phase:
      generating node representations by neighborhood aggregation operators;
      generating sparsified subgraphs by top-k neighbor sampling from a learned neighborhood ranking distribution;
      feeding the sparsified subgraphs to a task;
      generating a prediction;
      collecting a prediction error to update parameters in the generating and feeding steps to minimize an error; and
   in a testing phase:
      generating node representations by neighborhood aggregation operators related to testing data;
      generating sparsified subgraphs by top-k neighbor sampling from a learned neighborhood ranking distribution related to the testing data;
      feeding the sparsified subgraphs related to the testing data to a task; and
      outputting prediction results to a visualization device.

2. The method of claim 1, wherein the generating node representations step in the training phase is generated by first-order neighborhood aggregation.

3. The method of claim 2, wherein the first-order neighborhood aggregation is given by:

$$z^{(1)}_u = M_w(x_u, \{x_v | v \text{ in } N_u\}, \{e_{u,v} | v \text{ in } N_u\}),$$

where $z^{(1)}_u$ is a vector representation of node u after first-order neighborhood, $x_u$ is a vector representation of u's features, $x_v$ is a vector representation of neighbor v's attributes, $e_{u,v}$ is a vector representation of edge features, and $M_{w(\ )}$ is a neighborhood aggregation function parameterized by w, where w is a learned parameter.

4. The method of claim 1, wherein the generating node representations step in the training phase is generated by multi-order neighborhood aggregation.

5. The method of claim 1, wherein the generating sparsified subgraphs by top-k neighbor sampling in the training phase is generated by an edge importance score.

6. The method of claim 5, wherein the edge importance score is given by:

$$z_{u,v} = MLP_\theta(z_u, z_v, e_{u,v}),$$

where $z_{u,v}$ is a scalar indicating an importance score of edge (u, v), $z_u$ is a node representation of u, $z_v$ is a node representation of v, $e_{u,v}$ is a vector representation of edge features, and $MLP_{\theta(\ )}$ is a multi-layer neural network parameterized by $\theta$, where $\theta$ is a learned parameter.

7. The method of claim 1, wherein the generating sparsified subgraphs by top-k neighbor sampling in the training phase is generated by a soft permutation matrix given as:

$$P_{sort}[i, :] = \frac{\exp\left(((n+1-2i)g_{u,i} - A_g[i, :]U)/\tau\right)}{\sum_{j \in N_u} \exp\left(((n+1-2i)g_{u,j} - A_g[j, :]U)/\tau\right)},$$

where $\tau$ is a constant, $A_g[i, j] = |g_{u,i} - g_{u,j}|$, and U is a column vector of all ones.

8. The method of claim 1, wherein the collecting a prediction error step in the training phase includes computing an error measurement and backpropagation.

9. A non-transitory computer-readable storage medium comprising a computer-readable program for employing a differentiable ranking based graph sparsification (DRGS) network to use supervision signals from downstream tasks to guide graph sparsification, wherein the computer-readable program when executed on a computer causes the computer to perform the steps of:
   in a training phase:
      generating node representations by neighborhood aggregation operators;
      generating sparsified subgraphs by top-k neighbor sampling from a learned neighborhood ranking distribution;
      feeding the sparsified subgraphs to a task;
      generating a prediction;
      collecting a prediction error to update parameters in the generating and feeding steps to minimize an error; and
   in a testing phase:
      generating node representations by neighborhood aggregation operators related to testing data;

generating sparsified subgraphs by top-k neighbor sampling from a learned neighborhood ranking distribution related to the testing data;

feeding the sparsified subgraphs related to the testing data to a task; and outputting prediction results to a visualization device.

10. The non-transitory computer-readable storage medium of claim 9, wherein the generating node representations step in the training phase is generated by first-order neighborhood aggregation.

11. The non-transitory computer-readable storage medium of claim 10, wherein the first-order neighborhood aggregation is given by:

$$z^{(1)}_u = M_w(x_u, \{x_v | v \text{ in } N_u\}, \{e_{u,v} | v \text{ in } N_u\}),$$

where $z^{(1)}_u$ is a vector representation of node u after first-order neighborhood, $x_u$ is a vector representation of u's features, $x_v$ is a vector representation of neighbor v's attributes, $e_{u,v}$ is a vector representation of edge features, and $M_w(\ )$ is a neighborhood aggregation function parameterized by w, where w is a learned parameter.

12. The non-transitory computer-readable storage medium of claim 9, wherein the generating node representations step in the training phase is generated by multi-order neighborhood aggregation.

13. The non-transitory computer-readable storage medium of claim 9, wherein the generating sparsified subgraphs by top-k neighbor sampling in the training phase is generated by an edge importance score.

14. The non-transitory computer-readable storage medium of claim 13, wherein the edge importance score is given by:

$$z_{u,v} = MLP_\theta(z_u, z_v, e_{u,v}),$$

where $z_{u,v}$ is a scalar indicating an importance score of edge (u, v), $z_u$ is a node representation of u, $z_v$ is a node representation of v, $e_{u,v}$ is a vector representation of edge features, and $MLP_{\theta(\ )}$ is a multi-layer neural network parameterized by θ, where θ is a learned parameter.

15. The non-transitory computer-readable storage medium of claim 9, wherein the generating sparsified subgraphs by top-k neighbor sampling in the training phase is generated by a soft permutation matrix given as:

$$P_{sort}[i, :] = \frac{\exp\left(((n+1-2i)g_{u,i} - A_g[i, :]U)/\tau\right)}{\sum_{j \in N_u} \exp\left(((n+1-2i)g_{u,j} - A_g[j, :]U)/\tau\right)},$$

where τ is a constant, $A_g[i, j] = |g_{u,i} - g_{u,j}|$, and U is a column vector of all ones.

16. The non-transitory computer-readable storage medium of claim 9, wherein the collecting a prediction error step in the training phase includes computing an error measurement and backpropagation.

17. A system for employing a differentiable ranking based graph sparsification (DRGS) network to use supervision signals from downstream tasks to guide graph sparsification, the system comprising:

a memory; and one or more processors in communication with the memory configured to:

in a training phase:

generate node representations by neighborhood aggregation operators;

generate sparsified subgraphs by top-k neighbor sampling from a learned neighborhood ranking distribution;

feed the sparsified subgraphs to a task;

generate a prediction;

collect a prediction error to update parameters in the generating and feeding steps to minimize an error; and in a testing phase:

generate node representations by neighborhood aggregation operators related to testing data;

generate sparsified subgraphs by top-k neighbor sampling from a learned neighborhood ranking distribution related to the testing data;

feed the sparsified subgraphs related to the testing data to a task; and output prediction results to a visualization device.

18. The system of claim 17, wherein the generating node representations step in the training phase is generated by first-order neighborhood aggregation.

19. The system of claim 18, wherein the first-order neighborhood aggregation is given by:

$$z^{(1)}_u = M_w(x_u, \{x_v | v \text{ in } N_u\}, \{e_{u,v} | v \text{ in } N_u\}),$$

where $z^{(1)}_u$ is a vector representation of node u after first-order neighborhood, $x_u$ is a vector representation of u's features, $x_v$ is a vector representation of neighbor v's attributes, $e_{u,v}$ is a vector representation of edge features, and $M_w(\ )$ is a neighborhood aggregation function parameterized by w, where w is a learned parameter.

20. The system of claim 17, wherein the generating node representations step in the training phase is generated by multi-order neighborhood aggregation.

\* \* \* \* \*